(12) United States Patent
Hanov et al.

(10) Patent No.: US 10,497,185 B2
(45) Date of Patent: Dec. 3, 2019

(54) APPARATUS AND METHOD FOR VEHICLE MAINTENANCE SCHEDULING AND FAULT MONITORING

(71) Applicant: The Boeing Company, Chicago, IL (US)

(72) Inventors: Nile Hanov, Huntington Beach, CA (US); James M. Ethington, St. Charles, MO (US); Liessman E. Sturlaugson, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 183 days.

(21) Appl. No.: 15/824,231

(22) Filed: Nov. 28, 2017

(65) Prior Publication Data
US 2019/0164358 A1 May 30, 2019

(51) Int. Cl.
*G07C 5/00* (2006.01)
*G05B 23/02* (2006.01)
(Continued)

(52) U.S. Cl.
CPC ......... *G07C 5/006* (2013.01); *G05B 23/0283* (2013.01); *G06Q 10/1097* (2013.01);
(Continued)

(58) Field of Classification Search
CPC .. G07C 5/006; G07C 5/0808; G07C 2205/02; G05B 23/0283; G05B 23/0245; G06Q 10/1097; G06Q 10/20; B64F 5/60
See application file for complete search history.

(56) References Cited

U.S. PATENT DOCUMENTS 7,006,947 B2 * 2/2006 Tryon, III ............. G06F 11/008
702/183
7,027,953 B2 * 4/2006 Klein ..................... G01H 1/006
702/182

(Continued)

FOREIGN PATENT DOCUMENTS

WO   2017118559   7/2017

OTHER PUBLICATIONS

Extended European Search Report, European Application No. 18207299, dated Apr. 3, 2019.

*Primary Examiner* — Calvin Cheung
(74) *Attorney, Agent, or Firm* — Perman & Green, LLP

(57) ABSTRACT

A vehicle health monitoring system including a rules generation module that receives historical time-stamped vehicle fault data for a vehicle system, determines a correlation between pairs of a precedent historical vehicle fault data, of the historical time-stamped vehicle fault data, and a subsequent different historical vehicle fault data, of the historical time-stamped vehicle fault data, and generates maintenance rules based on the correlation determined for the pairs. A fault detection module of the system monitors faults of the vehicle system, where the vehicle faults include a plurality of time-stamped precedent vehicle fault data, applies the rules to the plurality of time-stamped precedent vehicle fault data, determines an imminent occurrence of a subsequent vehicle fault, and generates a maintenance report corresponding to the imminent occurrence of the subsequent vehicle fault so that proactive maintenance is performed on the vehicle system.

20 Claims, 10 Drawing Sheets

(51) Int. Cl.
 *G06Q 10/10* (2012.01)
 *G06Q 10/00* (2012.01)
 *G07C 5/08* (2006.01)
 *B64F 5/60* (2017.01)
(52) U.S. Cl.
 CPC .......... *G06Q 10/20* (2013.01); *G07C 5/0808* (2013.01); *B64F 5/60* (2017.01); *G05B 23/0245* (2013.01); *G07C 2205/02* (2013.01)

(56) References Cited

U.S. PATENT DOCUMENTS

| | | | |
|---|---|---|---|
| 10,248,742 B2 * | 4/2019 | Desell | G01C 23/00 |
| 2003/0191563 A1 * | 10/2003 | Eagleton | G05B 23/0229 |
| | | | 701/33.4 |
| 2003/0216889 A1 * | 11/2003 | Marko | G07C 5/008 |
| | | | 702/182 |
| 2006/0047481 A1 * | 3/2006 | Kanai | G06F 11/0709 |
| | | | 702/184 |
| 2007/0250228 A1 * | 10/2007 | Reddy | B60R 25/00 |
| | | | 701/31.4 |
| 2008/0059019 A1 * | 3/2008 | Delia | G07C 5/085 |
| | | | 701/33.4 |
| 2010/0094836 A1 * | 4/2010 | Duncan | G06Q 30/04 |
| | | | 707/705 |
| 2011/0118905 A1 | 5/2011 | Mylaraswamy et al. | |
| 2012/0209569 A1 | 8/2012 | Becourt et al. | |
| 2013/0159240 A1 * | 6/2013 | Singh | G05B 23/0275 |
| | | | 706/51 |
| 2014/0052531 A1 * | 2/2014 | Kent | G06Q 30/02 |
| | | | 705/14.49 |
| 2015/0269490 A1 * | 9/2015 | Stillinger | F02C 9/00 |
| | | | 706/52 |
| 2017/0091289 A1 * | 3/2017 | Ohazulike | G06Q 50/01 |
| 2018/0025392 A1 * | 1/2018 | Helstab | G06Q 30/0278 |
| | | | 705/306 |
| 2018/0121903 A1 * | 5/2018 | Al Salah | G06Q 20/24 |
| 2018/0174373 A1 * | 6/2018 | Hansen | B01F 5/0611 |
| 2018/0330558 A1 * | 11/2018 | Park | G07C 5/0825 |
| 2018/0348250 A1 * | 12/2018 | Higgins | G01P 5/00 |
| 2019/0026963 A1 * | 1/2019 | Watson | G07C 5/0808 |
| 2019/0141069 A1 * | 5/2019 | Pogorelik | H04L 63/1425 |

* cited by examiner

| VEHICLE ID | FAULT CODE | YEAR | DAY OF YEAR | MISSION TYPE | AGE AT FAULT (VEHICLE AGE AT X1 OCCURRENCE) | HOURS OF MAINTENANCE | DAYS BEFORE X1 |
|---|---|---|---|---|---|---|---|
| 123 | X1 | 2001 | 165 | 456 | 1 | 23 | 0 |
| 123 | Y2 | 2002 | 148 | 456 | 2 | 85 | 436 |
| 123 | Y3 | 2002 | 252 | 456 | 2 | 10 | 332 |
| 123 | Y1 | 2002 | 280 | 456 | 2 | 53 | 304 |
| 123 | Y0 | 2002 | 281 | 456 | 2 | 5 | 303 |
| 123 | Y2 | 2002 | 303 | 456 | 2 | 10 | 281 |
| 123 | Y2 | 2002 | 357 | 456 | 2 | 20 | 227 |
| 123 | Y3 | 2002 | 364 | 456 | 2 | 56 | 220 |
| 123 | Y4 | 2003 | 22 | 456 | 3 | 53 | 197 |
| 123 | Y5 | 2003 | 28 | 456 | 3 | 26 | 191 |
| 123 | Y2 | 2003 | 29 | 234 | 3 | 55 | 190 |
| 123 | Y7 | 2003 | 36 | 234 | 3 | 83 | 183 |
| 123 | Y8 | 2003 | 49 | 234 | 3 | 100 | 170 |
| 123 | Y2 | 2003 | 49 | 234 | 3 | 2 | 170 |
| 123 | Y10 | 2003 | 51 | 234 | 3 | 2 | 168 |
| 123 | Y1 | 2003 | 56 | 234 | 3 | 21 | 163 |
| 123 | Y10 | 2003 | 57 | 234 | 3 | 23 | 162 |
| 123 | Y5 | 2003 | 98 | 234 | 3 | 84 | 121 |
| 123 | Y2 | 2003 | 147 | 234 | 3 | 53 | 72 |
| 123 | Y3 | 2003 | 209 | 234 | 3 | 65 | 10 |
| 123 | X1 | 2003 | 219 | 234 | 3 | 145 | 0 |

FIG.3

APPARATUS AND METHOD FOR VEHICLE MAINTENANCE SCHEDULING AND FAULT MONITORING

BACKGROUND

1. Field

The exemplary embodiments generally relate to vehicle maintenance scheduling and fault monitoring, and more particularly to vehicle maintenance scheduling and fault monitoring using fault code frequencies determined from event-driven data.

2. Brief Description of Related Developments

Generally, when event-driven data is used for predictive analysis the result of the prediction is inherently poor. This is because of the way the event-driven data is collected. For example, event-driven data is generally captured when a trigger event has occurred so that only a single instance of data is captured (e.g., at the instance of the trigger event). In physical systems, examples of a trigger event may be a temperature exceedance event, a certain altitude being achieved, or other suitable event for which one may desire to capture data.

When applied to vehicle maintenance, the use of event-driven data generally leads to reactive vehicle maintenance that is likely to take the vehicle system, or the vehicle itself, out of service at times that may be unpredictable. Unpredicted removal of the vehicle from service for maintenance may be expensive (due to, e.g., loss of revenue generated by the vehicle, etc.) and reduce the availability of the vehicle. Generally in event-driven systems, data before the trigger event is not available (e.g., is not captured or recorded) which makes forecasting or predicting vehicle faults complicated due to a scarcity or lack of data to make the prediction.

Solving the issue of scarce data is generally difficult and conventional solutions for doing so each have their drawbacks. Some conventional solutions may use a passive predictive approach that tries to achieve predictability by creating a lower sensing threshold at which a particular vehicle component is expected to experience a fault. The use of lower sensing thresholds also generally produces a high number of false positive indications of component fault. In addition, these lower sensing thresholds for the particular vehicle component are generally considered in isolation and not in conjunction with other related vehicle components. As such, the passive predictive approach may not take into account data from other vehicle systems or areas within a system that may yield insight into the behavior of the particular vehicle component.

Generally, in event-driven system additional sensors are added to generate increased amounts of data for predicting vehicle component faults. However, the additional sensors increase the cost and complexity of the vehicle and may not provide adequate data for determining an impending fault in the particular vehicle component.

SUMMARY

Accordingly, apparatuses and methods, intended to address at least one or more of the above-identified concerns, would find utility.

The following is a non-exhaustive list of examples, which may or may not be claimed, of the subject matter according to the present disclosure.

One example of the subject matter according to the present disclosure relates to a vehicle health monitoring system comprising: a vehicle system maintenance rules generation module configured so as to couple with a vehicle, the vehicle system maintenance rules generation module being configured to receive historical time-stamped vehicle fault data for a vehicle system; determine a correlation between pairs of a precedent historical vehicle fault data, of the historical time-stamped vehicle fault data, and a subsequent different historical vehicle fault data, of the historical time-stamped vehicle fault data, and generate vehicle system maintenance rules based on the correlation determined for the pairs of the precedent historical vehicle fault data and the subsequent different historical vehicle fault data; and a vehicle system fault detection module configured so as to couple with the vehicle to monitor faults of the vehicle system where the vehicle faults include a plurality of time-stamped precedent vehicle fault data, the vehicle system fault detection module being further configured to apply the vehicle system maintenance rules to the plurality of time-stamped precedent vehicle fault data, determine an imminent occurrence of a subsequent vehicle fault, based on the application of the vehicle system maintenance rules to the plurality of time-stamped precedent vehicle fault data, and generate a maintenance report corresponding to the imminent occurrence of the subsequent vehicle fault so that proactive maintenance is performed on the vehicle system; wherein the plurality of time-stamped precedent vehicle fault data corresponds with the precedent historical vehicle fault data, and the subsequent vehicle fault corresponds with the subsequent different historical vehicle fault data.

Another example of the subject matter according to the present disclosure relates to a vehicle maintenance scheduling apparatus comprising: a records module configured so as to couple with a vehicle to receive historical time-stamped vehicle fault data for a vehicle system; a vehicle system fault correlation module configured to determine a correlation between pairs of a precedent historical vehicle fault data, of the historical time-stamped vehicle fault data, and a subsequent different historical vehicle fault data, of the historical time-stamped vehicle fault data, and generate vehicle system maintenance rules based on the correlation determined for the pairs of the precedent historical vehicle fault data and the subsequent different historical vehicle fault data; and a vehicle maintenance scheduling engine configured so as to couple with the vehicle to monitor faults of the vehicle system where the vehicle faults include a plurality of time-stamped precedent vehicle fault data, the vehicle maintenance scheduling engine being further configured to apply the vehicle system maintenance rules to the plurality of time-stamped precedent vehicle fault data, determine an imminent occurrence of a subsequent vehicle fault, based on the application of the vehicle system maintenance rules to the plurality of time-stamped precedent vehicle fault data, and generate a maintenance report corresponding to the imminent occurrence of the subsequent vehicle fault so that proactive maintenance is performed on the vehicle system; wherein plurality of time-stamped precedent vehicle fault data corresponds with the precedent historical vehicle fault data, and the subsequent vehicle fault corresponds with the subsequent different historical vehicle fault data.

Still another example of the subject matter according to the present disclosure relates to a method for proactive vehicle maintenance. The method comprising: receiving from a vehicle, with a vehicle system maintenance rules generation module, historical time-stamped vehicle fault data for a vehicle system of the vehicle; determining, with the vehicle system maintenance rules generation module, a correlation between pairs of a precedent historical vehicle fault data, of the historical time-stamped vehicle fault data, and a subsequent different historical vehicle fault data, of the historical time-stamped vehicle fault data; generating, with the vehicle system maintenance rules generation module, vehicle system maintenance rules based on the correlation determined for the pairs of the precedent historical vehicle fault data and the subsequent historical different vehicle fault data; monitoring faults of the vehicle system, with a vehicle system fault detection module, where the vehicle faults include a plurality of time-stamped precedent vehicle fault data; applying, with the vehicle system fault detection module, the vehicle system maintenance rules to the plurality of time-stamped precedent vehicle fault data; determining, with the vehicle system fault detection module, an imminent occurrence of a subsequent vehicle fault, based on the application of the vehicle system maintenance rules to the plurality of time-stamped precedent vehicle fault data; and generating, with the vehicle system fault detection module, a maintenance report corresponding to the imminent occurrence of the subsequent vehicle fault so that the proactive maintenance is performed on the vehicle system; wherein the plurality of time-stamped precedent vehicle fault data corresponds with the precedent historical vehicle fault data, and the subsequent vehicle fault corresponds with the subsequent different historical vehicle fault data.

BRIEF DESCRIPTION OF THE DRAWINGS

Figure 1A:
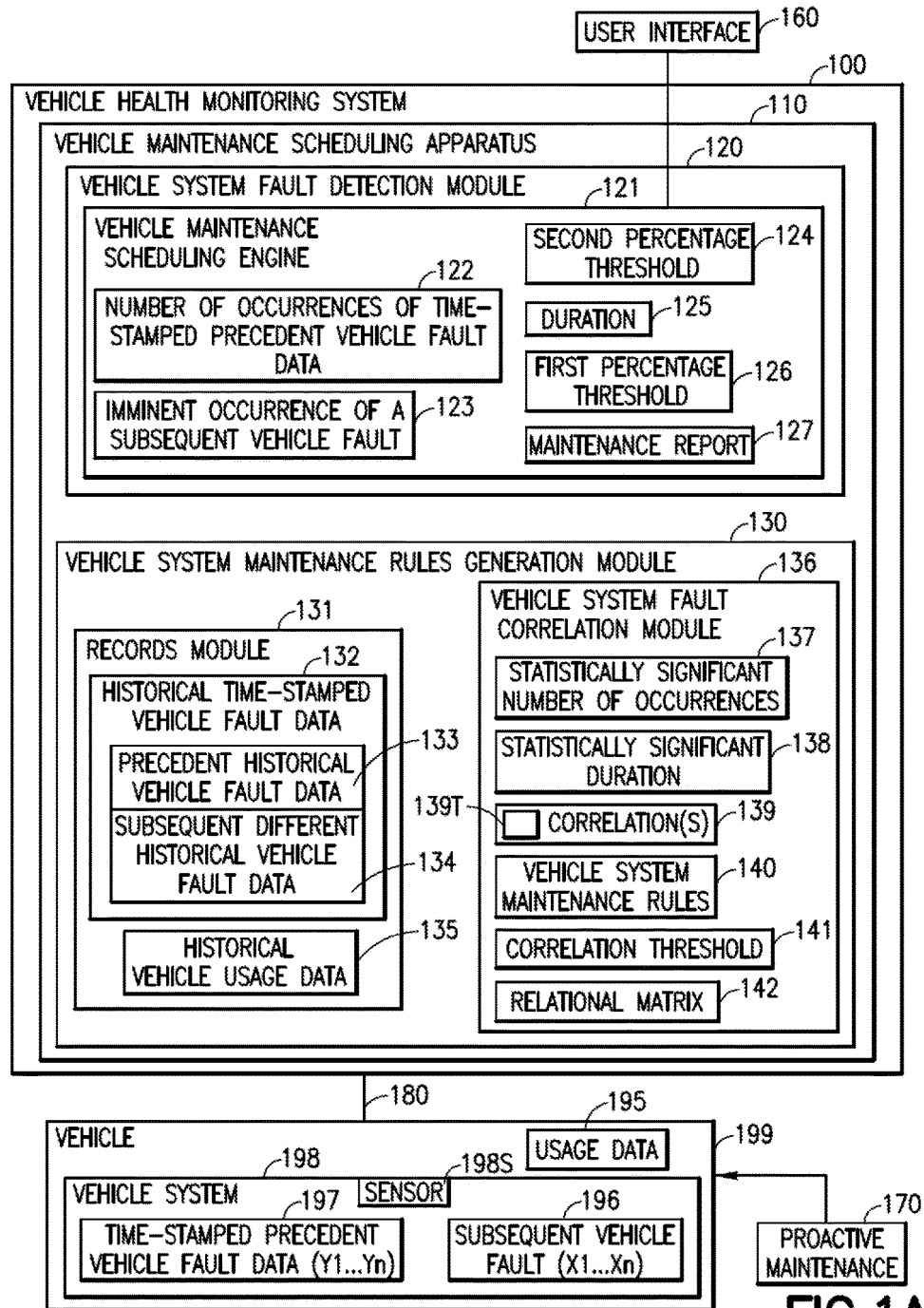
Figure 1B:
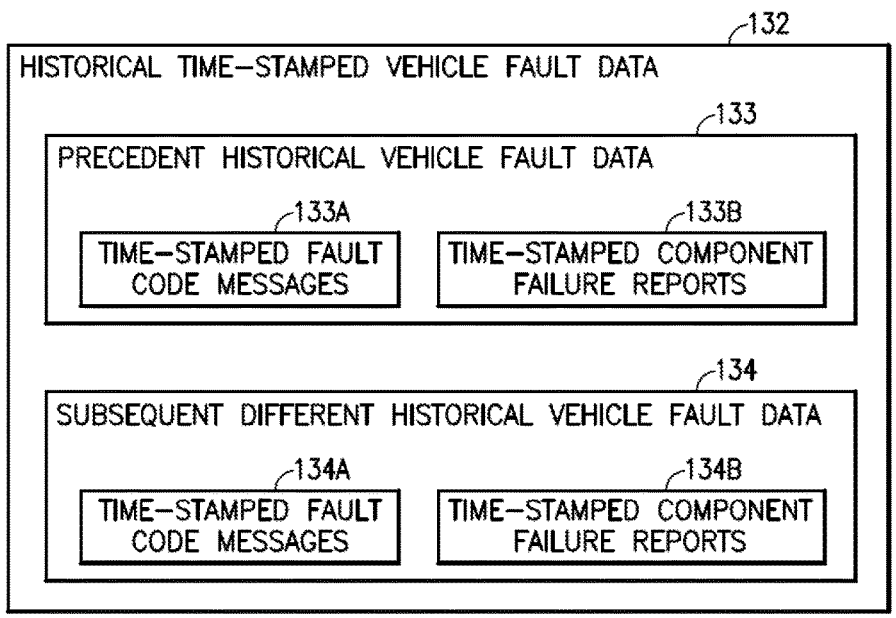
Figure 1C:
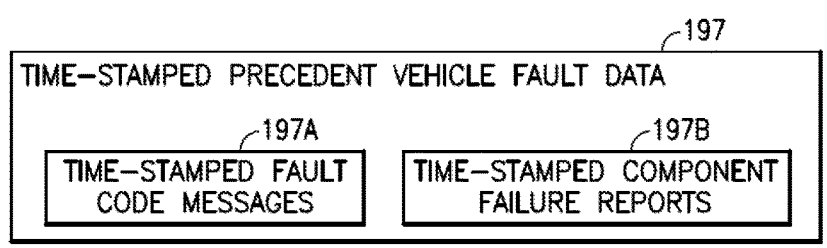
Figure 1D:
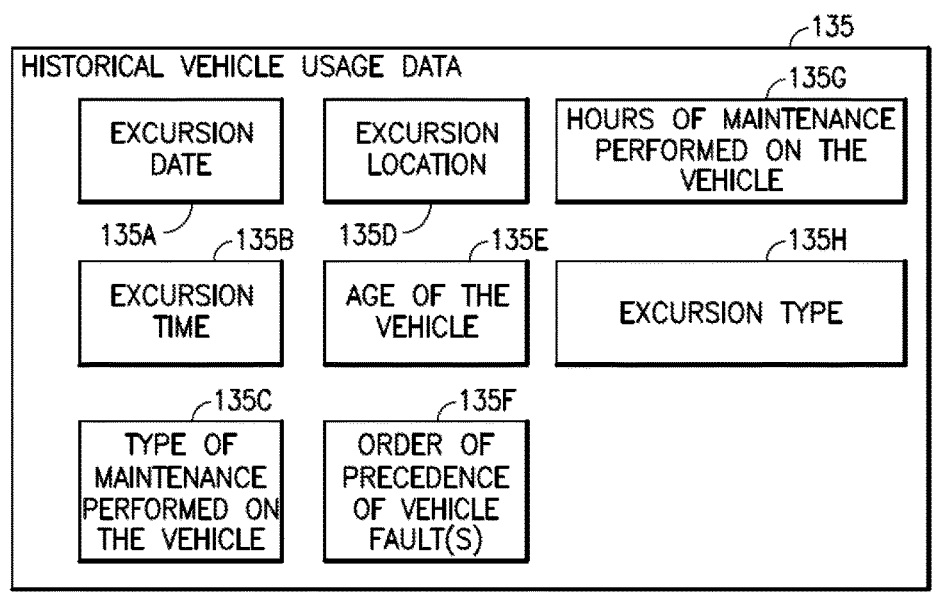
Figure 1E:
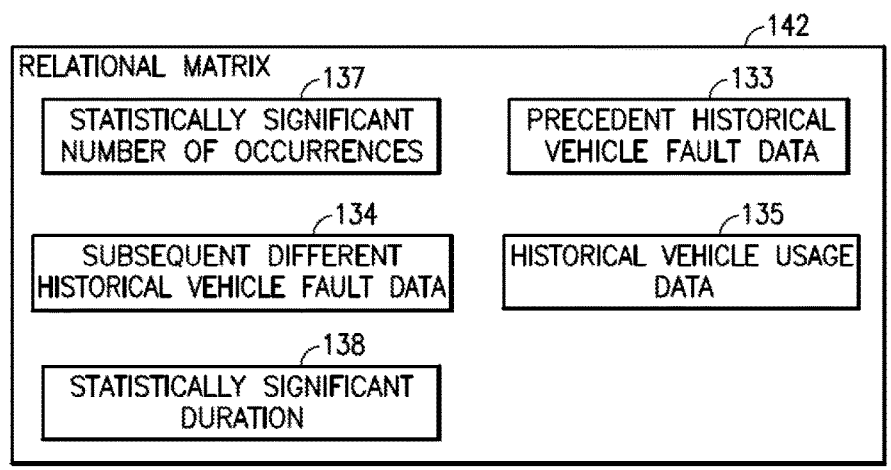
Figure 2:
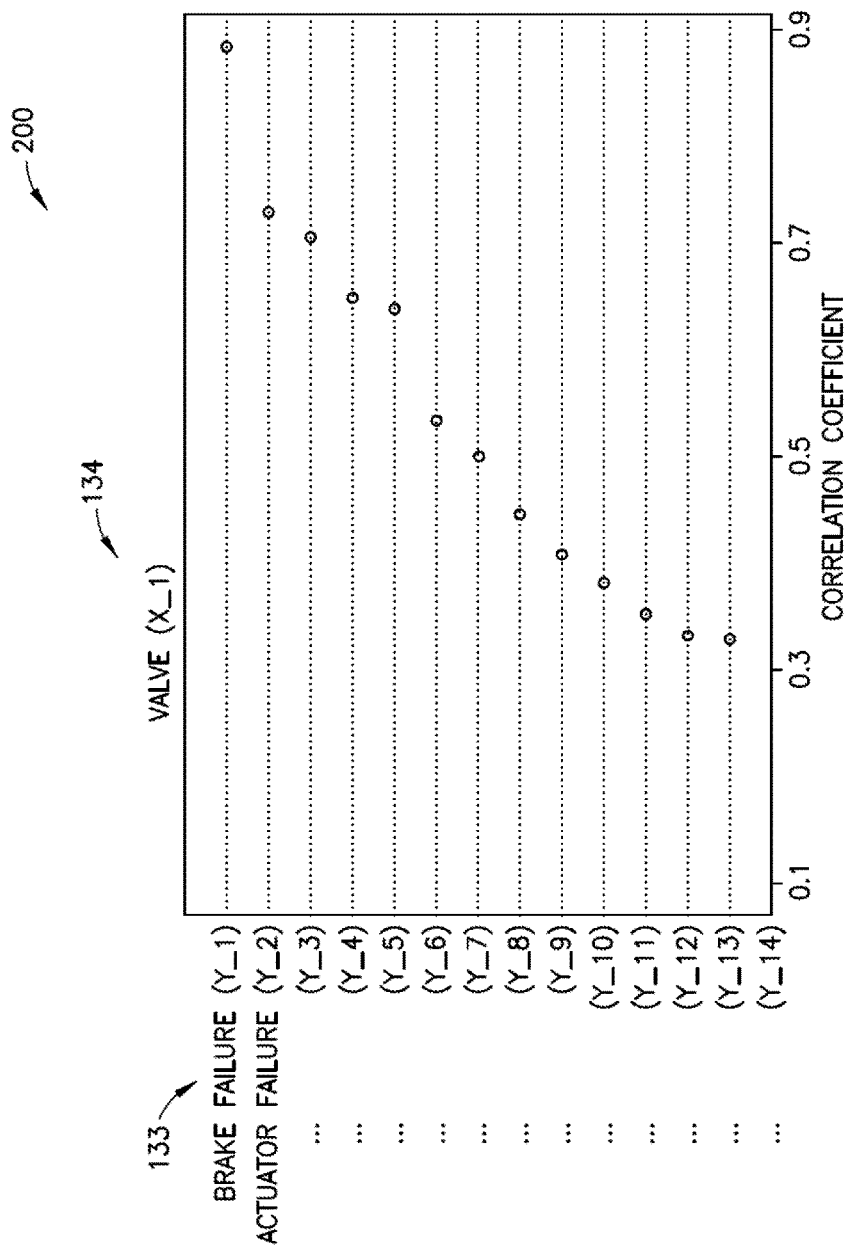
Figure 4:
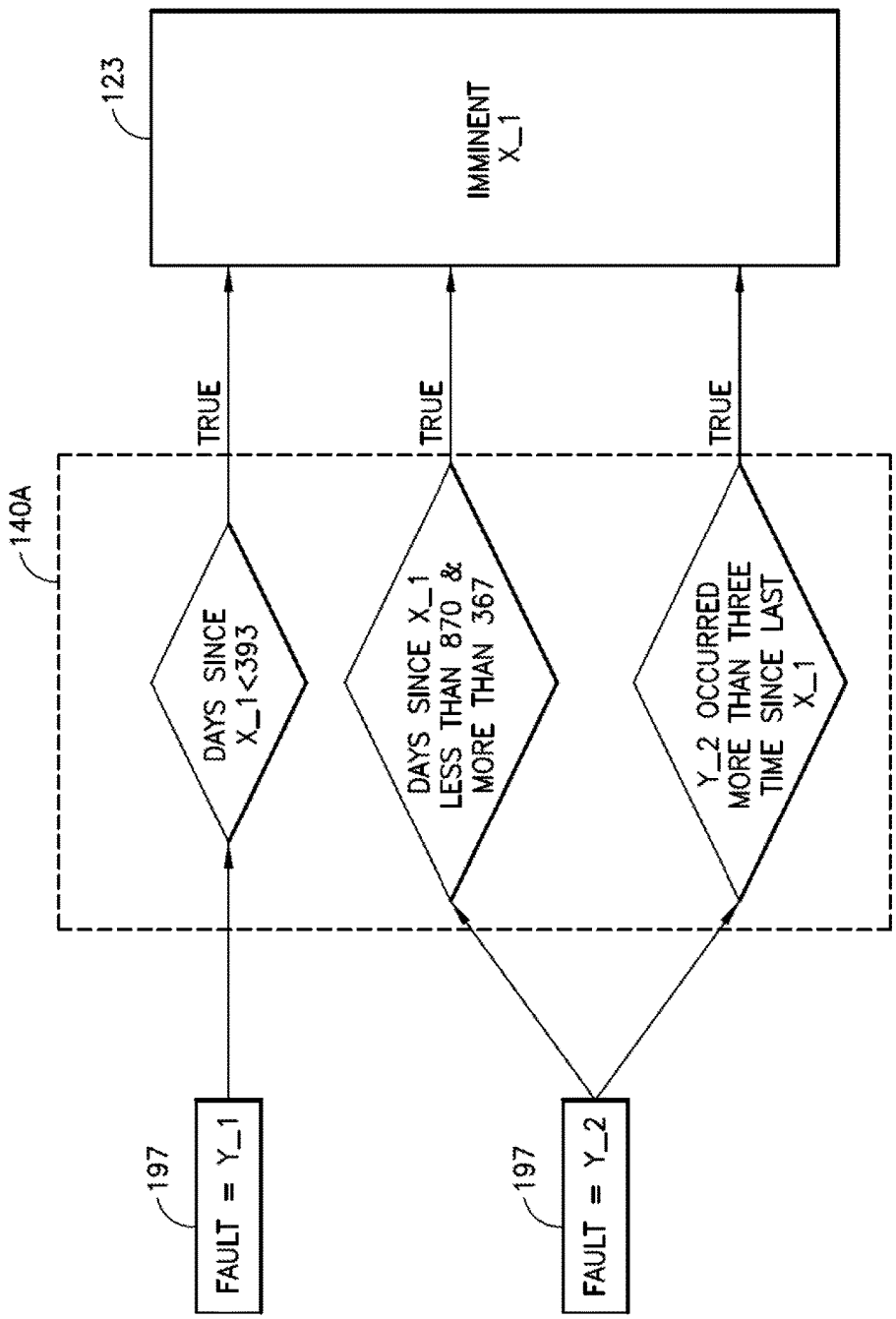
Figure 5:
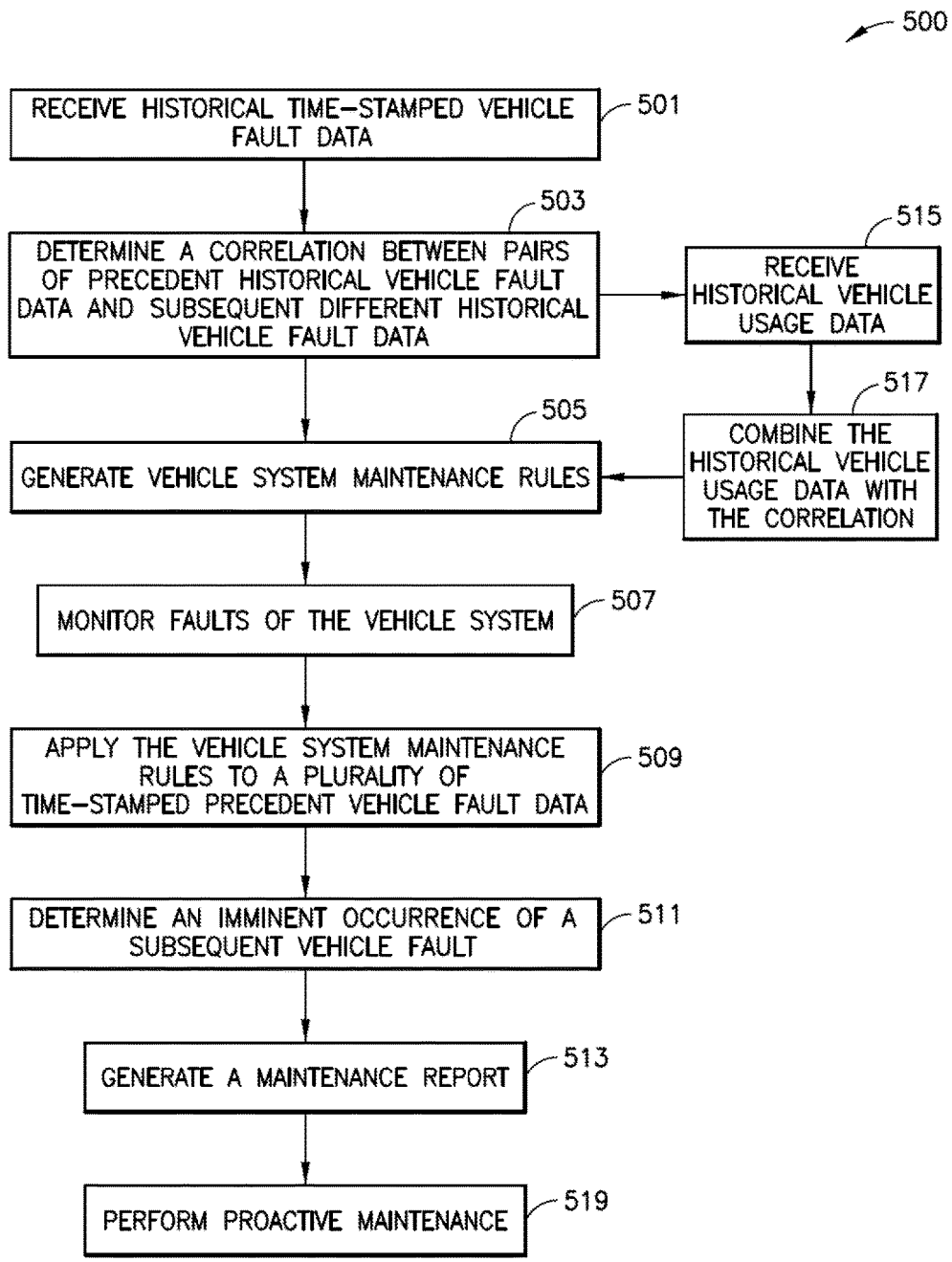
Figure 6:
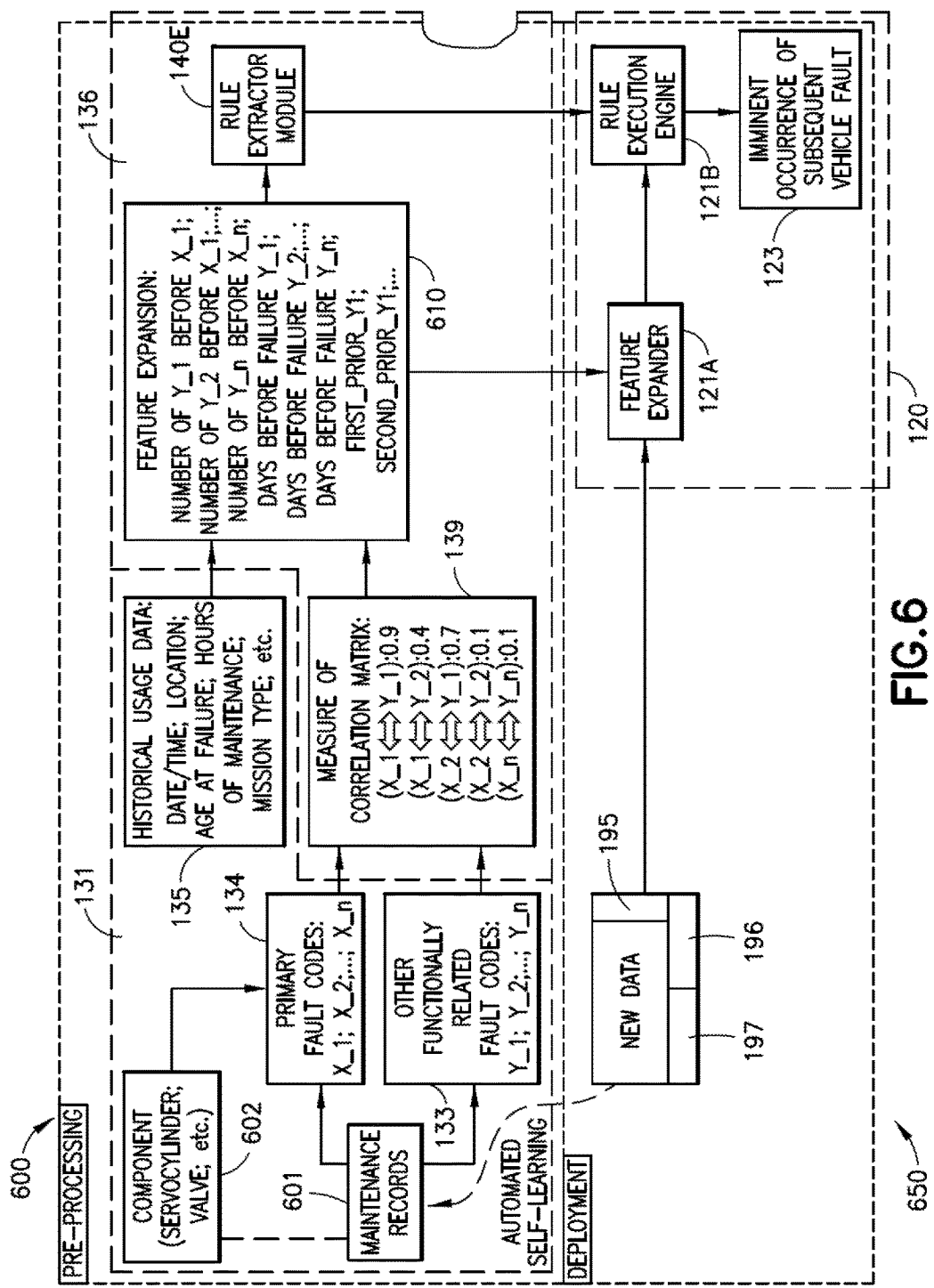
Figure 7:
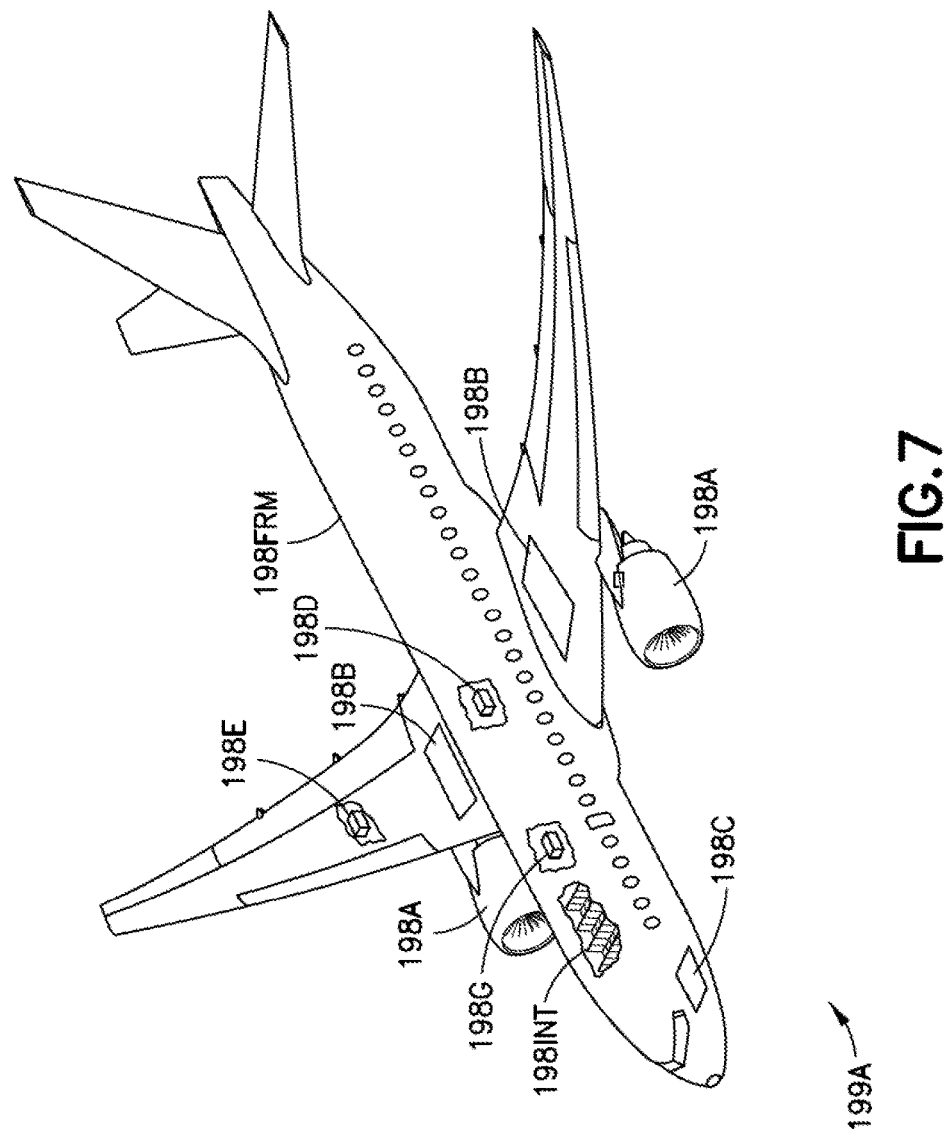
Figure 8:
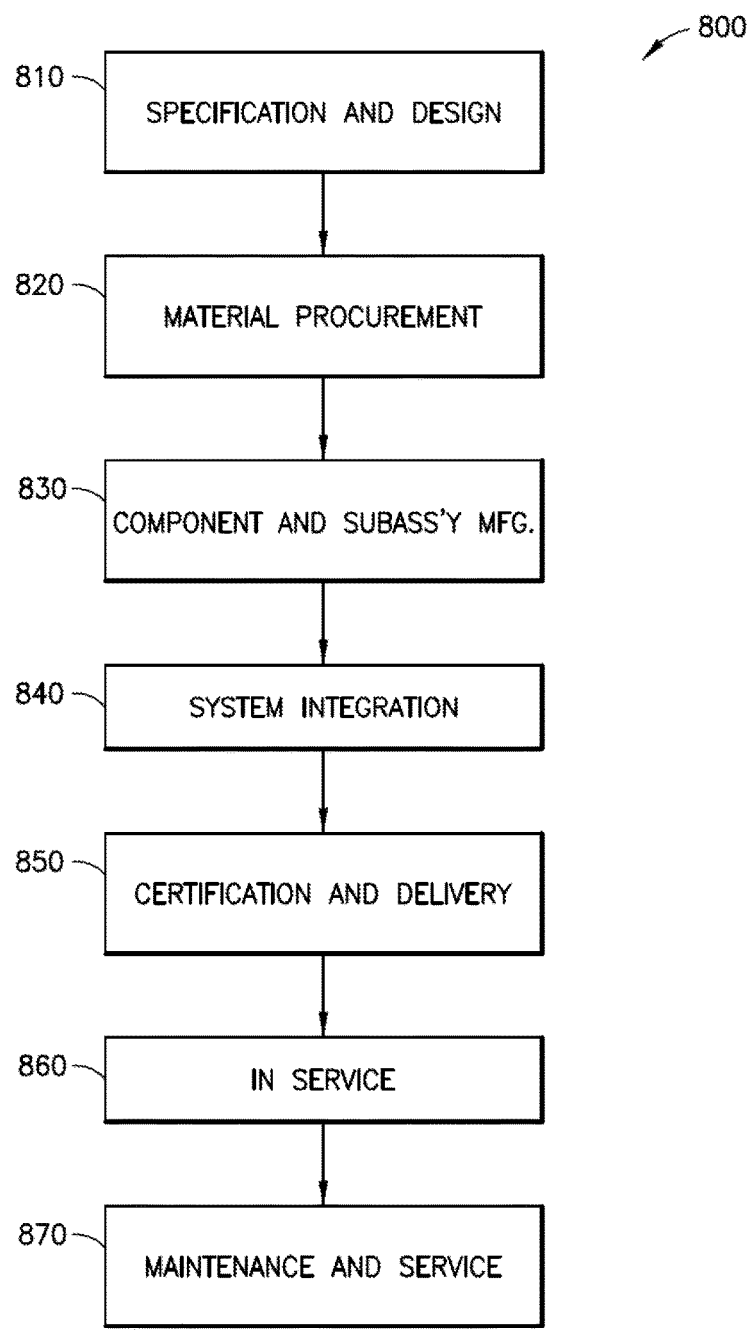

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a schematic block diagram of a vehicle health monitoring system in accordance with aspects of the present disclosure;

FIG. 1B is a schematic block diagram of a portion of the vehicle health monitoring system in accordance with aspects of the present disclosure;

FIG. 1C is a schematic block diagram of a portion of the vehicle health monitoring system in accordance with aspects of the present disclosure;

FIG. 1D is a schematic block diagram of a portion of the vehicle health monitoring system in accordance with aspects of the present disclosure;

FIG. 1E is a schematic block diagram of a portion of the vehicle health monitoring system in accordance with aspects of the present disclosure;

FIG. 2 is an exemplary correlation chart in accordance with aspects of the present disclosure;

FIG. 3 is an exemplary feature expansion matrix in accordance with aspects of the present disclosure;

FIG. 4 is an exemplary application of a vehicle system maintenance rule in accordance with aspects of the present disclosure;

FIG. 5 is an exemplary flow diagram of a method for proactive vehicle maintenance in accordance with aspects of the present disclosure;

FIG. 6 is an exemplary flow diagram for portions of the method of FIG. 5 in accordance with aspects of the present disclosure;

FIG. 7 is an exemplary illustration of the vehicle in FIG. 1 in accordance with aspects of the present disclosure; and FIG. 8 is an exemplary flow diagram of an aircraft production and service methodology.

DETAILED DESCRIPTION

Referring to FIGS. 1A and 7, the vehicle health monitoring system 100 will be described with respect to a fixed wing aircraft, such as aircraft 199A for exemplary purposes only. However, it should be understood that the vehicle health monitoring system 100 may be deployed in any suitable vehicle 199, including but not limited to aerospace vehicles, rotary wing aircraft, unmanned aerial vehicles (UAVs), fixed wing aircraft, lighter than air vehicles, maritime vehicles, and automotive vehicles. In one aspect the vehicle 199 includes at least one vehicle system 198 each having one or more (e.g., a plurality of) respective components (e.g., engines and components thereof, air conditioning systems and components thereof, etc.). The at least one vehicle system 198 may include propulsion systems 198A, hydraulic systems 198E, electrical systems 198D, main landing gear systems 108B, and nose landing gear system 198C. The vehicle 199 may also include an interior 198INT having an environmental system 198G. In other aspects, the vehicle systems 198 may also include one or more control systems coupled to an airframe 198FRM of the vehicle 199, such as for example, flaps, spoilers, ailerons, slats, rudders, elevators, and trim tabs.

Referring to FIG. 1A, the aspects of the present disclosure provide for a vehicle health monitoring system 100 that is configured to predict faults in a vehicle system 198, such as for a predetermined component 602 (FIG. 6) of the vehicle system 198, in circumstances where there is no single definitive indicator of imminent fault of the vehicle system 198 and, where over time, there is growing evidence of an eventual vehicle system fault. In the aspects of the present disclosure the vehicle health monitoring system 100 predicts faults for a predetermined vehicle system 198 component 602 (FIG. 6) based on event-driven data (e.g., precedent and subsequent vehicle fault data) and historical vehicle usage data 135. The vehicle health monitoring system 100 is configured to determine one or more correlations 139 between subsequent different historical vehicle fault data 134 (e.g., primary fault codes) and precedent historical vehicle fault data 133 (e.g., other fault codes that are functionally related to the primary fault code). The vehicle health monitoring system combines the correlations 139 with the historical vehicle usage data 135 to generate feature vectors from which vehicle system maintenance rules 140 are extracted. Once the vehicle system maintenance rules 140 are established, the vehicle health monitoring system 100 monitors time-stamped precedent vehicle fault data 197 received from the vehicle 199 to determine if the time-stamped precedent vehicle fault data 197 is indicative of an imminent occurrence of a vehicle fault. The aspects of the present disclosure also provide the vehicle health monitoring system with automated self-learning as the vehicle fault data, that is the bases of the vehicle system maintenance rule extraction, are continually updated. This automated self-learning provides the vehicle health monitoring system 100 with increasing accuracy over time for predicting vehicle system faults.

Illustrative, non-exhaustive examples, which may or may not be claimed, of the subject matter according to the present disclosure are provided below.

Still referring to FIG. 1A as well as FIGS. 1B-1E, the vehicle health monitoring system 100 includes a vehicle system maintenance rules generation module 130 and a vehicle system fault detection module 120. The vehicle system maintenance rules generation module 130 and the vehicle system fault detection module 120, in one aspect, are included in a vehicle maintenance scheduling apparatus 110 of the vehicle health monitoring system 100. The vehicle system maintenance rules generation module 130 is configured so as to couple with the vehicle 109 in any suitable manner through coupling 180. The coupling 180 may be any suitable direct or indirect communication coupling such as, for example, one or more of a wired communication coupling, a wireless communication coupling, and communication using any suitable portable data transfer medium. The vehicle system maintenance rules generation module 130 is configured to receive historical time-stamped vehicle fault data 132 for the vehicle system 198, receive historical vehicle usage data 135, and determine one or more correlation 139 between pairs of a precedent historical vehicle fault data 133, of the historical time-stamped vehicle fault data 132, and a subsequent different historical vehicle fault data 134, of the historical time-stamped vehicle fault data 132. The vehicle system maintenance rules generation module 130 is also configured to generate vehicle system maintenance rules 140 based on the correlation(s) 139 determined for the pairs of the precedent historical vehicle fault data 133 and the subsequent different historical vehicle fault data 134.

For example, the vehicle system maintenance rules generation module 130 includes a records module 131 and a vehicle system fault correlation module 136. The records module 131 is configured so as to couple with the vehicle 199, such as through coupling 180, to receive the historical time-stamped vehicle fault data 132 for the vehicle system 198. The records module 131 may also be configured to receive historical vehicle usage data 135 from the vehicle 199 or other suitable data storage, such as a database of an operator of the vehicle 199. The historical vehicle usage data 135 may include (referring to FIG. 1D) any suitable data pertaining to the usage of the vehicle including, but not limited to, one or more of an excursion date 135A, an excursion time 135B, an excursion location 135D, an age of the vehicle 135E (e.g., such as when one or more of a precedent or subsequent vehicle fault occurred), hours of maintenance performed on the vehicle 135G, excursion type 135H, a type of maintenance performed on the vehicle 135C, and an order of precedence of vehicle fault data 135F.

Referring to FIGS. 1A and 2, the vehicle system fault correlation module 136 is configured to determine the correlation(s) 139 between the pairs of the precedent historical vehicle fault data 133, of the historical time-stamped vehicle fault data 132, and the subsequent different historical vehicle fault data 134, of the historical time-stamped vehicle fault data 132. For example, the subsequent different historical vehicle fault data 134 includes historical data that pertains to a subsequent vehicle fault 196. The subsequent vehicle fault 196 may be any one of primary vehicle faults X1-Xn (where n is any suitable integer representing an upper limit to the number primary faults that may exist for the vehicle system 198). The precedent historical vehicle fault data 133 includes historical data pertains to the time-stamped precedent vehicle fault data 197. The time-stamped precedent vehicle fault data 197 includes data for any one of related vehicle faults Y1-Yn (where n is any suitable integer representing an upper limit to the number primary faults that may exist for the vehicle system 198) where the related vehicle faults Y1-Yn may be indicative of an imminent occurrence of one or more of the primary vehicle faults X1-Xn. The vehicle system fault correlation module 136 is configured to determine one or more correlations 139 between at least one (or each) of the primary vehicle faults X1-Xn and the related vehicle faults Y1-Yn in any suitable manner, such as by determining a correlation coefficient. For exemplary purposes only. FIG. 2 illustrates an exemplary correlation chart 200 where the correlation coefficient was determined for at least one of the related vehicle faults Y1-Yn and the primary vehicle fault X1. The vehicle system fault correlation module 136 is configured to determine which pairs of the precedent historical vehicle fault data 133 (e.g., related vehicle faults Y1-Yn) and the subsequent different historical vehicle fault data 134 (e.g., the primary vehicle faults X1-Xn) exceed a correlation threshold 139T, where if the correlation threshold 139T is exceeded it is determined that there is a correlation between the precedent historical vehicle fault data 133 and the subsequent different historical vehicle fault data 134 for purposes of generating the vehicle system maintenance rules 140. In one aspect, the correlation threshold 139T is about 50% (e.g., a correlation coefficient of about 0.5) but, it should be understood that the correlation threshold may be higher or lower than about 50% depending on, for example, the vehicle system 198. For example, the propulsion systems 198A may have a lower correlation threshold 139T than the environmental system 198G.

In accordance with the aspects of the present disclosure, for the at least one (or each) pair of the precedent historical vehicle fault data 133 and the subsequent different historical vehicle fault data 134 that exceed the correlation threshold 139T, the vehicle system fault correlation module 136 of the vehicle system maintenance rules generation module 130 is configured to determine a statistically significant number of occurrences 137 of the precedent historical vehicle fault data 133 that occurred prior to an occurrence of the corresponding subsequent different historical vehicle fault data 134. For example, the statistically significant number of occurrences 137 may be an average number of occurrences, a maximum number of occurrences, a minimum number of occurrences, a variance between occurrences, or any other statistically meaningful value. The vehicle system fault correlation module 136 is also configured to, for the at least one (or each) pair of the precedent historical vehicle fault data 133 and the subsequent different historical vehicle fault data 134 that exceed the correlation threshold 139T, generate a relational matrix 142 including the statistically significant number of occurrences 137 of the precedent historical vehicle fault data 133 that occurred prior to an occurrence of the corresponding subsequent different historical vehicle fault data 134 and at least one or more of the precedent historical vehicle fault data 133, the subsequent different historical vehicle fault data 134, and historical vehicle usage data 135 (see FIG. 1E).

In accordance with the aspects of the present disclosure, for the at least one (or each) pair of the precedent historical vehicle fault data 133 and the subsequent different historical vehicle fault data 134 that exceed the correlation threshold 139T, the vehicle system fault correlation module 136 of the vehicle system maintenance rules generation module 130 is configured to determine a statistically significant duration 138 between occurrences of the precedent historical vehicle fault data 133 that occurred prior to an occurrence of the corresponding subsequent historical different vehicle fault data 134. For example, the statistically significant number of occurrences may be an average number of occurrences, a maximum number of occurrences, a minimum number of occurrences, a variance between occurrences, or any other statistically meaningful value. The vehicle system fault correlation module 136 is also configured to, for the at least one (or each) pair of the precedent historical vehicle fault data 133 and the subsequent different historical vehicle fault data 134 that exceed the correlation threshold 139T, populate the relational matrix 142 with the statistically significant duration 138 between the occurrences of the precedent historical vehicle fault data 133 that occurred prior to the occurrence of the subsequent different historical vehicle fault data 134.

Referring again to FIGS. 1A-1E, the vehicle system fault correlation module 136 is also configured to generate the vehicle system maintenance rules 140 based on the correlation(s) 139 determined for the pairs of the precedent historical vehicle fault data 133 and the subsequent different historical vehicle fault data 134. For example, the vehicle system fault correlation module 136 of the vehicle system maintenance rules generation module 130 is configured to combine the historical vehicle usage data 135 with the correlation 139, determined for the pairs of the precedent historical vehicle fault data 133 and the subsequent different historical vehicle fault data 134, to generate the vehicle system maintenance rules 140. This combination of the historical vehicle usage data 135 with the correlation 139 is a feature expansion 610 (FIG. 6) that provides for the generation of feature vectors (e.g., a number of related vehicle fault Y1 before an occurrence of primary vehicle fault X1, a number of related vehicle fault Y2 before an occurrence of primary vehicle fault X1, a number of days T1 occurred prior to the occurrence of primary vehicle fault X1, an order of occurrences of related vehicle fault Y1, etc.). An exemplary feature expansion matrix 300 is illustrated in FIG. 3. In this example, the feature expansion matrix 300 includes a vehicle identification 301, a fault code 302, a year 303 the fault occurred, a day of year 304 the fault occurred, a mission type 305 (e.g., the type of mission the vehicle was performing), an age at fault 306 (e.g., the age of the vehicle when the fault occurred), hours of maintenance 307 performed on the vehicle to remedy the fault, and days before the subsequent different historical vehicle fault 308. In this example, as a result of the correlation 139 is has been determined that related vehicle faults Y1, Y2, Y3, Y4, Y5, Y7, Y8, and Y10 meet the correlation threshold (e.g., have the requisite relationship with primary vehicle vault X1 per the correlation threshold 139T) and are included in the feature expansion matrix 300 for extraction of the vehicle system maintenance rules 140.

Referring to FIGS. 1A and 4, the vehicle system fault correlation module is configured to extract the vehicle system maintenance rules 140 based on the historical vehicle usage data 135 and the correlation(s) 139, such as presented in the feature expansion matrix 300. One example of a vehicle system maintenance rule 140A that may be extracted from the historical vehicle usage data 135 and the correlation(s) 139 is illustrated in FIG. 4 where:

if the Y1 fault occurred less than 393 days since the last occurrence of the X1 fault; and the Y2 fault occurred anywhere between 367 and 870 days since the last occurrence of the X1 fault; and the Y2 fault has already occurred at least three times;

then the occurrence of another X1 fault is imminent.

It should be understood that FIG. 4 illustrates just one exemplary vehicle system maintenance rule 140 and that other vehicle system maintenance rules 140 are possible based on the historical vehicle usage data 135 and the correlation(s) 139. The vehicle system fault correlation module 136 may include a rule extractor module 140E (FIG. 6) that is configured to extract the vehicle system maintenance rules 140 in any suitable manner. For example, the rule extractor module 140E may be configured with any suitable machine learning such as decision trees, neural networks, etc. that are trained/configured in any suitable manner to recognize any suitable patterns, relationships, and/or chain of events between the pairs of precedent historical vehicle fault data 133 (e.g., the related vehicle faults Y1-Yn) and the subsequent different historical vehicle fault data (e.g., the primary vehicle faults X1-Xn) that exceed the correlation threshold 141 in conjunction with the historical vehicle usage data 135.

Referring to FIG. 1A, the vehicle system fault detection module 120 is configured so as to couple with the vehicle 199, such as through coupling 180, to monitor vehicle faults of the vehicle system 198 where the vehicle faults include a plurality of time-stamped precedent vehicle fault data 197 that will be analyzed by the vehicle system fault detection module 120 and compared with the vehicle system maintenance rules 140 for predicting an imminent occurrence of a subsequent vehicle fault 123. The plurality of time-stamped precedent vehicle fault data 197 maybe obtained by the vehicle maintenance scheduling engine 121 in substantially real-time. In one aspect, substantially real-time is the vehicle maintenance scheduling engine 121 obtains the plurality of time-stamped precedent vehicle fault data 197 as each time-stamped precedent vehicle fault data is generated by the vehicle system 198. In another aspect, substantially real-time is when the vehicle maintenance scheduling engine 121 obtains the plurality of time-stamped precedent vehicle fault data 197 when the vehicle 199 returns from an excursion or prior to the vehicle 199 leaving for an excursion. In accordance with aspects of the present disclosure one or more of the historical time-stamped vehicle fault data 132 (e.g., one or more of the precedent historical vehicle fault data 133 and the subsequent different historical vehicle fault data 134) and the plurality of time-stamped precedent vehicle fault data 197 comprise time-stamped fault code messages 133A, 134A, 197A (FIGS. 1B and 1C). In accordance with aspects of the present disclosure one or more of the historical time-stamped vehicle fault data 132 (e.g., one or more of the precedent historical vehicle fault data 133 and the subsequent different historical vehicle fault data 134) and the plurality of time-stamped precedent vehicle fault data 197 comprises time-stamped component failure reports 133B, 134B, 197B (FIGS. 1B and 1C).

The vehicle system fault detection module 120 is further configured to apply the vehicle system maintenance rules 140 to the plurality of time-stamped precedent vehicle fault data 197. The vehicle system fault detection module is also configured to determine the imminent occurrence of a subsequent vehicle fault 123, based on the application of the vehicle system maintenance rules 140 to the plurality of time-stamped precedent vehicle fault data 197, and generate a maintenance report 127 corresponding to the imminent occurrence of the subsequent vehicle fault 123 so that proactive maintenance 170 is performed on the vehicle system 198 which may proactively avoid the subsequent vehicle fault 196. The plurality of time-stamped precedent vehicle fault data 197 corresponds with the precedent historical vehicle fault data 133, and the subsequent vehicle fault 196 corresponds with the subsequent different historical vehicle fault data 134.

As an example, the vehicle system fault detection module 120 may include a vehicle maintenance scheduling engine 121 configured so as to couple with the vehicle 199 to monitor the faults of the vehicle system 198. The vehicle maintenance scheduling engine 121 is configured to apply the vehicle system maintenance rules 140 to the plurality of time-stamped precedent vehicle fault data 197, determine the imminent occurrence of a subsequent vehicle fault 123, based on the application of the vehicle system maintenance rules 140 to the plurality of time-stamped precedent vehicle fault data 197, and generate the maintenance report 127. For example, vehicle maintenance scheduling engine 121 of the vehicle system fault detection module 120 may include a feature expander 121A (FIG. 6) and a rule execution engine 121B (FIG. 6). The feature expander 121A is configured to combine the plurality of time-stamped precedent vehicle fault data 197 with corresponding usage data 195 (e.g., usage data present at the time the plurality of time-stamped precedent vehicle fault 197 data was obtained) in a manner substantially similar to that described above so that a feature expansion matrix may be generated (the feature expansion matrix being substantially similar to that shown in FIG. 3 but for the plurality of time-stamped precedent vehicle fault data 197 with corresponding usage data 195 instead of the pairs of precedent historical vehicle fault data 133 and subsequent different historical vehicle fault data 134 and the historical vehicle usage data 135). The rule execution engine 121B is configured to apply the vehicle system maintenance rules 140 to the plurality of time-stamped precedent vehicle fault data 197 and corresponding usage data 195.

In one aspect, the imminent occurrence of the subsequent vehicle fault 123 is based on at least a number of occurrences of the plurality of time-stamped precedent vehicle fault data 122, where the vehicle system fault detection module 120, through the vehicle maintenance scheduling engine 121, is configured to generate the maintenance report 127 when the number of occurrences of the plurality of time-stamped precedent vehicle fault data 122 reaches a first percentage threshold 126 of the statistically significant number of occurrences 137 of the precedent historical vehicle fault data 133 that occurred prior to an occurrence of the subsequent different historical vehicle fault data 134. In another aspect, the imminent occurrence of the subsequent vehicle fault 123 is based on at least a duration 125 between occurrences of the plurality of time-stamped precedent vehicle fault data 197, where the vehicle system fault detection module 120 is configured to generate the maintenance report 127 when the duration 125 between occurrences of the plurality of time-stamped precedent vehicle fault data 197 reaches a second percentage threshold 124 of the statistically significant duration 138 between occurrences of the precedent historical vehicle fault data 133 that occurred prior to an occurrence of the subsequent different historical vehicle fault data 134.

The vehicle system maintenance rules generation module 130 is configured to receive, after one or more of each determination of the imminent occurrence of the subsequent vehicle fault 123 and the occurrence of the subsequent vehicle fault 196, at least the plurality of time-stamped precedent vehicle fault data 197 for inclusion in the historical time-stamped vehicle fault data 132, such as for inclusion in the precedent historical vehicle fault data 133. The vehicle system maintenance rules generation module 130 is configured to receive, after each determination of the imminent occurrence of the subsequent vehicle fault 123 or after the occurrence of the subsequent vehicle fault 196, data corresponding to the subsequent vehicle fault 196 for inclusion in the historical time-stamped vehicle fault data 132, such as for inclusion in the subsequent different historical vehicle fault data 134. The vehicle system maintenance rules generation module 130 is configured to receive the usage data 195 corresponding to the plurality of time-stamped precedent vehicle fault data 197 and/or the subsequent vehicle fault 196 for inclusion in the historical time-stamped vehicle fault data 132, such as for inclusion in the historical vehicle usage data 135. The inclusion of one or more of the plurality of time-stamped precedent vehicle fault data 197, the subsequent vehicle fault 196, and the usage data 195 provides for automated self-learning of the vehicle health monitoring system 100 and for increased accuracy in the vehicle fault predictions made by the vehicle health monitoring system 100 by increasing the knowledge base of the vehicle health monitoring system 100.

The vehicle health monitoring system 100 may also include a user interface 160 coupled to the vehicle system fault detection module 120. The vehicle system fault detection module 120, such as through the vehicle maintenance scheduling engine 121, is configured to cause the maintenance report 127 to be presented on the user interface 160 to effect the proactive maintenance 170 of the vehicle system 198.

In one aspect, the vehicle health monitoring system 100 also includes one or more sensors 198S disposed in respective vehicle systems 198. Each of the sensors 198S is configured to obtain one or more of the plurality of time-stamped precedent vehicle fault data 197, the subsequent vehicle fault 196, and the usage data 195. The one or more sensors 198S may be coupled to one or more of the vehicle system maintenance rules generation module 130 and the vehicle system fault detection module 120 in any suitable manner, such as through coupling 180, for providing the vehicle health monitoring system 100 with the information described above for determining the imminent occurrence of a subsequent vehicle fault 123.

Referring to FIGS. 1A-1E, 5 and 6 an exemplary method 500 for proactive vehicle maintenance will be described. The method 500 includes a pre-processing 600 component and a deployment 650 component. In the pre-processing component 600, the vehicle health monitoring system 100 is trained and the vehicle system maintenance rules 140 are generated. For example, the vehicle system maintenance rules generation module 130 receives, from the vehicle, historical time-stamped vehicle fault data 132 for a vehicle system 198 of the vehicle 199 (FIG. 5, Block 501) in the manner described above. The historical time-stamped vehicle fault data 132 may be obtained from maintenance records 601, or any other suitable data source, and include a component 602 identification associated with precedent historical vehicle fault data 133 (e.g., the primary vehicle faults X1-Xn) and the subsequent different historical vehicle fault data 134 (e.g., the related vehicle faults Y1-Yn). The vehicle system maintenance rules generation module 130 determines one or more correlation 139 between pairs of the precedent historical vehicle fault data 133, of the historical time-stamped vehicle fault data 132, and a subsequent different historical vehicle fault data 134, of the historical time-stamped vehicle fault data 132 (FIG. 5, Block 503) as described above. The vehicle system maintenance rules generation module 130 generates/extracts vehicle system maintenance rules 140 based on the correlation(s) 139 determined for the pairs of the precedent historical vehicle fault data 133 and the subsequent different historical vehicle fault data 134 (FIG. 5, Block 505) as described above. For example, the vehicle system maintenance rules generation module 130 may receive or otherwise obtain the historical vehicle usage data 135 (FIG. 5, Block 515) and combine the historical vehicle usage data 135 with the correlation(s) 139

(FIG. 5, Block 517) to provide for the features expansion 610 from which the vehicle system maintenance rules 140 are extracted, as described above.

In the deployment 650 component of the method 500, the vehicle system fault detection module 120 monitors faults of the vehicle system 198 where the vehicle faults include a plurality of time-stamped precedent vehicle fault data 197 (FIG. 5, Block 507) as described above. The vehicle system fault detection module 120 applies the vehicle system maintenance rules 140 to the plurality of time-stamped precedent vehicle fault data 197 (FIG. 5, Block 509) as described above. The vehicle system fault detection module 120 determines an imminent occurrence of a subsequent vehicle fault 123, based on the application of the vehicle system maintenance rules 140 to the plurality of time-stamped precedent vehicle fault data 197 (FIG. 5, Block 511) as described above. The vehicle system fault detection module 120 generates a maintenance report 513 corresponding to the imminent occurrence of the subsequent vehicle fault 123 (FIG. 5, Block 513) so that the proactive maintenance 170 is performed on the vehicle system 198 (FIG. 5, Block 519).

Referring to FIGS. 7 and 8, examples of the present disclosure may be described in the context of aircraft manufacturing and service method 800 as shown in FIG. 8. In other aspects, the examples of the present disclosure may be applied in any suitable industry, such as e.g., automotive, maritime, aerospace, etc. as noted above. With respect to aircraft manufacturing, during pre-production, illustrative method 800 may include specification and design (block 810) of aircraft 199A and material procurement (block 820). During production, component and subassembly manufacturing (block 830) and system integration (block 840) of aircraft 199A may take place. Thereafter, aircraft 199A may go through certification and delivery (block 850) to be placed in service (block 860). While in service, aircraft 199A may be scheduled for routine maintenance and service (block 870). Routine maintenance and service may include modification, reconfiguration, refurbishment, etc. of one or more systems of aircraft 199A which may include and/or be facilitated by the fault determination described herein.

Each of the processes of illustrative method 800 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

The apparatus(es), system(s), and method(s) shown or described herein may be employed during any one or more of the stages of the manufacturing and service method 800. For example, components or subassemblies corresponding to component and subassembly manufacturing (block 830) may be fabricated or manufactured in a manner similar to components or subassemblies produced while aircraft 199A is in service (block 860). Similarly, one or more examples of the apparatus or method realizations, or a combination thereof, may be utilized, for example and without limitation, while aircraft 199A is in service (block 860) and or during maintenance and service (block 870).

The following are provided in accordance with the aspects of the present disclosur:

A1. A vehicle maintenance scheduling apparatus comprising:
a records module configured so as to couple with a vehicle to receive historical time-stamped vehicle fault data for a vehicle system;

a vehicle system fault correlation module configured to
determine a correlation between pairs of a precedent historical vehicle fault data, of the historical time-stamped vehicle fault data, and a subsequent different historical vehicle fault data, of the historical time-stamped vehicle fault data, and
generate vehicle system maintenance rules based on the correlation determined for the pairs of the precedent historical vehicle fault data and the subsequent historical different vehicle fault data; and
a vehicle maintenance scheduling engine configured so as to couple with the vehicle to monitor faults of the vehicle system where the vehicle faults include a plurality of time-stamped precedent vehicle fault data, the vehicle maintenance scheduling engine being further configured to
apply the vehicle system maintenance rules to the plurality of time-stamped precedent vehicle fault data,
determine an imminent occurrence of a subsequent vehicle fault, based on the application of the vehicle system maintenance rules to the plurality of time-stamped precedent vehicle fault data, and
generate a maintenance report corresponding to the imminent occurrence of the subsequent vehicle fault so that proactive maintenance is performed on the vehicle system; wherein plurality of time-stamped precedent vehicle fault data corresponds with the precedent historical vehicle fault data, and the subsequent vehicle fault corresponds with the subsequent different historical vehicle fault data.

A2. The vehicle maintenance scheduling apparatus of paragraph A1, wherein one or more of the historical time-stamped vehicle fault data and the plurality of time-stamped precedent vehicle fault data comprises time-stamped fault code messages.

A3. The vehicle maintenance scheduling apparatus of paragraph A1, wherein one or more of the historical time-stamped vehicle fault data and the plurality of time-stamped precedent vehicle fault data comprises time-stamped component failure reports.

A4. The vehicle maintenance scheduling apparatus of paragraph A1, wherein:
the records module is configured to receive historical vehicle usage data; and
the vehicle system fault correlation module is configured to
receive the historical vehicle usage data, and
combine the historical vehicle usage data with the correlation determined for the pairs of the precedent historical vehicle fault data and the subsequent historical different vehicle fault data to generate the vehicle system maintenance rules.

A5. The vehicle maintenance scheduling apparatus of paragraph A4, wherein the historical vehicle usage data includes one or more of an excursion date, an excursion time, an excursion location, an age of the vehicle, hours of maintenance performed on the vehicle, excursion type, a type of maintenance performed on the vehicle, and an order of precedence of vehicle fault data.

A6. The vehicle maintenance scheduling apparatus of paragraph A1, wherein:
the vehicle system fault correlation module is configured to determine which pairs of the precedent historical vehicle fault data and the subsequent historical different vehicle fault data exceed a correlation threshold; and
for at least one pan of the precedent historical vehicle fault data and the subsequent historical different vehicle fault data that exceed the correlation threshold, the vehicle system fault correlation module is configured to determine a statistically significant number of occurrences of the precedent historical vehicle fault data that occurred prior to an occurrence of the subsequent historical different vehicle fault data, and generate a relational matrix including the statistically significant number of occurrences of the precedent historical vehicle fault data that occurred prior to an occurrence of the subsequent historical different vehicle fault data and at least one or more of the precedent historical vehicle fault data, the subsequent historical different vehicle fault data, and historical vehicle usage data.

A7. The vehicle maintenance scheduling apparatus of paragraph A6, wherein the historical vehicle usage data includes one or more of an excursion date, an excursion time, an excursion location, an age of the vehicle, hours of maintenance performed on the vehicle, excursion type, a type of maintenance performed on the vehicle, and an order of precedence of vehicle fault data.

A8. The vehicle maintenance scheduling apparatus of paragraph A6, wherein the imminent occurrence of the subsequent vehicle fault is based on at least a number of occurrences of the plurality of time-stamped precedent vehicle fault data, where the vehicle maintenance scheduling engine is configured to generate the maintenance report when the number of occurrences of the plurality of time-stamped precedent vehicle fault data reaches a first percentage threshold of the statistically significant number of occurrences of the precedent historical vehicle fault data that occurred prior to an occurrence of the subsequent historical different vehicle fault data.

A9. The vehicle maintenance scheduling apparatus of paragraph A6, wherein the vehicle system fault correlation module is configured to, for the at least one pair of the precedent historical vehicle fault data and the subsequent historical different vehicle fault data that exceed the correlation threshold, determine a statistically significant duration between occurrences of the precedent historical vehicle fault data that occurred prior to an occurrence of the subsequent historical different vehicle fault data, and populate the relational matrix with the statistically significant duration between occurrences of the precedent historical vehicle fault data that occurred prior to an occurrence of the subsequent historical different vehicle fault data.

A10. The vehicle maintenance scheduling apparatus of paragraph A9, wherein the imminent occurrence of the subsequent vehicle fault is based on at least a duration between occurrences of the plurality of time-stamped precedent vehicle fault data, where the vehicle maintenance scheduling engine is configured to generate the maintenance report when the duration between occurrences of the plurality of time-stamped precedent vehicle fault data reaches a second percentage threshold of the statistically significant duration between occurrences of the precedent historical vehicle fault data that occurred prior to an occurrence of the subsequent historical different vehicle fault data.

A11. The vehicle maintenance scheduling apparatus of paragraph A1, wherein the records module is configured to receive, after one or more of each determination of the imminent occurrence of the subsequent vehicle fault and the occurrence of the subsequent vehicle fault, at least the plurality of nine-stamped precedent vehicle fault data for inclusion in the historical time-stamped vehicle fault data.

A12. The vehicle maintenance scheduling apparatus of paragraph A11, wherein the records module is configured to receive, after each determination of the imminent occurrence of the subsequent vehicle fault or after the occurrence of the subsequent vehicle fault, data corresponding to the subsequent vehicle fault for inclusion in the historical time-stamped vehicle fault data.

A13. The vehicle maintenance scheduling of paragraph A1, further comprising a user interface coupled to the vehicle maintenance scheduling engine, the vehicle maintenance scheduling engine being configured to cause the maintenance report to be presented on the user interface to effect the proactive maintenance.

B1. A vehicle health monitoring system comprising:
a vehicle system maintenance rules generation module configured so as to couple with a vehicle, the vehicle system maintenance rules generation module being configured to
receive historical time-stamped vehicle fault data for a vehicle system;
determine a correlation between pairs of a precedent historical vehicle fault data, of the historical time-stamped vehicle fault data, and a subsequent different historical vehicle fault data, of the historical time-stamped vehicle fault data, and
generate vehicle system maintenance rules based on the correlation determined for the pairs of the precedent historical vehicle fault data and the subsequent historical different vehicle fault data; and
a vehicle system fault detection module configured so as to couple with the vehicle to monitor faults of the vehicle system where the vehicle faults include a plurality of time-stamped precedent vehicle fault data, the vehicle system fault detection module being further configured to
apply the vehicle system maintenance rules to the plurality of time-stamped precedent vehicle fault data,
determine an imminent occurrence of a subsequent vehicle fault, based on the application of the vehicle system maintenance rules to the plurality of time-stamped precedent vehicle fault data, and
generate a maintenance report corresponding to the imminent occurrence of the subsequent vehicle fault so that proactive maintenance is performed on the vehicle system;
wherein the plurality of time-stamped precedent vehicle fault data corresponds with the precedent historical vehicle fault data, and the subsequent vehicle fault corresponds with the subsequent different historical vehicle fault data.

B2. The vehicle health monitoring system of paragraph B1, wherein one or more of the historical time-stamped vehicle fault data and the plurality of time-stamped precedent vehicle fault data comprise time-stamped fault code messages.

B3. The vehicle health monitoring system of paragraph B1, wherein one or more of the historical time-stamped vehicle fault data and the plurality of time-stamped precedent vehicle fault data comprise time-stamped component failure reports.

B4. The vehicle health monitoring system of paragraph B1, wherein the vehicle system maintenance rules generation module is configured to:
receive historical vehicle usage data; and
combine the historical vehicle usage data with the correlation determined for the pairs of the precedent historical vehicle fault data and the subsequent historical different vehicle fault data to generate the vehicle system maintenance rules.

B5. The vehicle health monitoring system of paragraph B4, wherein the historical vehicle usage data includes one or more of an excursion date, an excursion time, an excursion location, an age of the vehicle, hours of maintenance performed on the vehicle, excursion type, a type of maintenance performed on the vehicle, and an order of precedence of vehicle fault data.

B6. The vehicle health monitoring system of paragraph B1, wherein the vehicle system maintenance rules generation module is configured to:
determine which pairs of the precedent historical vehicle fault data and the subsequent historical different vehicle fault data exceed a correlation threshold; and
for at least one pair of the precedent historical vehicle fault data and the subsequent historical different vehicle fault data that exceed the correlation threshold,
determine a statistically significant number of occurrences of the precedent historical vehicle fault data that occurred prior to an occurrence of the subsequent historical different vehicle fault data, and
generate a relational matrix including the statistically significant number of occurrences of the precedent historical vehicle fault data that occurred prior to an occurrence of the subsequent historical different vehicle fault data and at least one or more of the precedent historical vehicle fault data, the subsequent historical different vehicle fault data, and historical vehicle usage data.

B7. The vehicle health monitoring system of paragraph B6, wherein the historical vehicle usage data includes one or more of an excursion date, an excursion time, an excursion location, an age of the vehicle, hours of maintenance performed on the vehicle, excursion type, a type of maintenance performed on the vehicle, and an order of precedence of vehicle fault data.

B8. The vehicle health monitoring system of paragraph B6, wherein the imminent occurrence of the subsequent vehicle fault is based on at least a number of occurrences of the plurality of time-stamped precedent vehicle fault data, where the vehicle system fault detection module is configured to generate the maintenance report when the number of occurrences of the plurality of time-stamped precedent vehicle fault data reaches a first percentage threshold of the significantly significant number of occurrences of the precedent historical vehicle fault data that occurred prior to an occurrence of the subsequent historical different vehicle fault data.

B9. The vehicle health monitoring system of paragraph B6, wherein the vehicle system maintenance rules generation module is configured to, for the at least one pair of the precedent historical vehicle fault data and the subsequent historical different vehicle fault data that exceed the correlation threshold,
determine a statistically significant duration between occurrences of the precedent historical vehicle fault data that occurred prior to an occurrence of the subsequent historical different vehicle fault data, and
populate the relational matrix with the statistically significant duration between occurrences of the precedent historical vehicle fault data that occurred prior to an occurrence of the subsequent historical different vehicle fault data.

B10. The vehicle health monitoring system of paragraph B9, wherein the imminent occurrence of the subsequent vehicle fault is based on at least a duration between occurrences of the plurality of time-stamped precedent vehicle fault data, where the vehicle system fault detection module is configured to generate the maintenance report when the duration between occurrences of the plurality of time-stamped precedent vehicle fault data reaches a second percentage threshold of the statistically significant duration between occurrences of the precedent historical vehicle fault data that occurred prior to an occurrence of the subsequent historical different vehicle fault data.

B11. The vehicle health monitoring system of paragraph B1, wherein the vehicle system maintenance rules generation module is configured to receive, after one or more of each determination of the imminent occurrence of the subsequent vehicle fault and the occurrence of the subsequent vehicle fault, at least the plurality of time-stamped precedent vehicle fault data for inclusion in the historical time-stamped vehicle fault data.

B12. The vehicle health monitoring system of paragraph B11, wherein the vehicle system maintenance rules generation module is configured to receive, after each determination of the imminent occurrence of the subsequent vehicle fault or after the occurrence of the subsequent vehicle fault, data corresponding to the subsequent vehicle fault for inclusion in the historical time-stamped vehicle fault data.

B13. The vehicle health monitoring system of paragraph B1, further comprising a user interface coupled to the vehicle system fault detection module, the vehicle system fault detection module being configured to cause the maintenance report to be presented on the user interface to effect the proactive maintenance.

C1. A method for proactive vehicle maintenance, the method comprising:
receiving from a vehicle, with a vehicle system maintenance rules generation module, historical time-stamped vehicle fault data for a vehicle system of the vehicle;
determining, with the vehicle system maintenance rules generation module, a correlation between pairs of a precedent historical vehicle fault data, of the historical time-stamped vehicle fault data, and a subsequent different historical vehicle fault data, of the historical time-stamped vehicle fault data;
generating, with the vehicle system maintenance rules generation module, vehicle system maintenance rules based on the correlation determined for the pairs of the precedent historical vehicle fault data and the subsequent historical different vehicle fault data;
monitoring faults of the vehicle system, with a vehicle system fault detection module, where the vehicle faults include a plurality of time-stamped precedent vehicle fault data;
applying, with the vehicle system fault detection module, the vehicle system maintenance rules to the plurality of time-stamped precedent vehicle fault data;
determining, with the vehicle system fault detection module, an imminent occurrence of a subsequent vehicle fault, based on the application of the vehicle system maintenance rules to the plurality of time-stamped precedent vehicle fault data; and
generating, with the vehicle system fault detection module, a maintenance report corresponding to the imminent occurrence of the subsequent vehicle fault so that the proactive maintenance is performed on the vehicle system;
wherein the plurality of time-stamped precedent vehicle fault data corresponds with the precedent historical vehicle fault data, and the subsequent vehicle fault corresponds with the subsequent different historical vehicle fault data.

C2. The method of paragraph C1, wherein one or more of the historical time-stamped vehicle fault data and the plurality of time-stamped precedent vehicle fault data comprises time-stamped fault code messages.

C3. The method of paragraph C1, wherein one or more of the historical time-stamped vehicle fault data and the plurality of time-stamped precedent vehicle fault data comprises time-stamped component failure reports.

C4. The method of paragraph C1, further comprising:
with the vehicle system maintenance rules generation module,
receiving historical vehicle usage data; and
combining the historical vehicle usage data with the correlation determined for the pairs of the precedent historical vehicle fault data and the subsequent historical different vehicle fault data to generate the vehicle system maintenance rules.

C5. The method of paragraph C4, wherein the historical vehicle usage date includes one or more of an excursion date, an excursion time, an excursion location, an age of the vehicle, hours of maintenance performed on the vehicle, excursion type, a type of maintenance performed on the vehicle, and an order of precedence of vehicle fault data.

C6. The method of paragraph C1, further comprising:
with the vehicle system maintenance rules generation module,
determining which pairs of the precedent historical vehicle fault data and the subsequent historical different vehicle fault data exceed a correlation threshold; and
for at least one pair of the precedent historical vehicle fault data and the subsequent historical different vehicle fault date that exceed the correlation threshold,
determining a statistically significant number of occurrences of the precedent historical vehicle fault data that occurred prior to an occurrence of the subsequent historical different vehicle fault data, and
generating a relational matrix including the statistically significant number of occurrences of the precedent historical vehicle fault data that occurred prior to an occurrence of the subsequent historical different vehicle fault data and at least one or more of the precedent historical vehicle fault data, the subsequent historical different vehicle fault data, and historical vehicle usage data.

C7. The method of paragraph A6, wherein the historical vehicle usage data includes one or more of an excursion date, an excursion tune, an excursion location, an age of the vehicle, hours of maintenance performed on the vehicle, excursion type, a type of maintenance performed on the vehicle, and an order of precedence of vehicle fault data.

C8. The method of paragraph C6, wherein the imminent occurrence of the subsequent vehicle fault is based on at least a number of occurrences of the plurality of time-stamped precedent vehicle fault data, the method further comprising:
generating, with the vehicle system fault detection module, the maintenance report when the number of occurrences of the plurality of time-stamped precedent vehicle fault data reaches a first percentage threshold of the statistically significant number of occurrences of the precedent historical vehicle fault data that occurred prior to an occurrence of the subsequent historical different vehicle fault data.

C9. The method of paragraph C6, further comprising:
with the vehicle system maintenance rules generation module, for the at least one pair of the precedent historical vehicle fault data and the subsequent historical different vehicle fault data that exceed the correlation threshold,
determining a statistically significant duration between occurrences of the precedent historical vehicle fault data that occurred prior to an occurrence of the subsequent historical different vehicle fault data, and
populating the relational matrix with the statistically significant duration between occurrences of the precedent historical vehicle fault data that occurred prior to an occurrence of the subsequent historical different vehicle fault data.

C10. The method of paragraph C9, wherein the imminent occurrence of the subsequent vehicle fault is based on at least a duration between occurrences of the plurality of time-stamped precedent vehicle fault data, the method further comprising:
generating, with the vehicle system fault detection module, the maintenance report when the duration between occurrences of the plurality of time-stamped precedent vehicle fault data reaches a second percentage threshold of the statistically significant duration between occurrences of the precedent historical vehicle fault data that occurred prior to an occurrence of the subsequent historical different vehicle fault data.

C11. The method of paragraph C1, further comprising:
receiving, with the vehicle system maintenance rules generation module, after one or more of each determination of the imminent occurrence of the subsequent vehicle fault and the occurrence of the subsequent vehicle fault, at least the plurality of time-stamped precedent vehicle fault data for inclusion in the historical time-stamped vehicle fault data.

C12. The method of paragraph C11, further comprising:
receiving, with the vehicle system maintenance rules generation module, after each determination of the imminent occurrence of the subsequent vehicle fault or after the occurrence of the subsequent vehicle fault, data corresponding to the subsequent vehicle fault for inclusion in the historical time-stamped vehicle fault data.

C13. The method of paragraph C1, further comprising presenting, on a user interface coupled to the vehicle system fault detection module, the maintenance report to effect the proactive maintenance.

In the figures, referred to above, solid lines, if any, connecting various elements and or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 5, 6, and 8, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that, not all dependencies among the various disclosed operations are necessarily represented. FIGS. 5, 6, and 8 and the accompanying disclosure describing the operations of the method (s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that, one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es), system(s), and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A vehicle health monitoring system comprising:
a vehicle system maintenance rules generation module configured so as to couple with a vehicle, the vehicle system maintenance rules generation module being configured to
receive historical time-stamped vehicle fault data for a vehicle system;
determine a correlation between pairs of a precedent historical vehicle fault data, of the historical time-stamped vehicle fault data, and a subsequent different historical vehicle fault data, of the historical time-stamped vehicle fault data, and
generate vehicle system maintenance rules based on the correlation determined for the pairs of the precedent historical vehicle fault data and the subsequent different historical vehicle fault data; and
a vehicle system fault detection module configured so as to couple with the vehicle to monitor faults of the vehicle system where the vehicle faults include a plurality of time-stamped precedent vehicle fault data, the vehicle system fault detection module being further configured to
apply the vehicle system maintenance rules to the plurality of time-stamped precedent vehicle fault data,
determine an imminent occurrence of a subsequent vehicle fault, based on the application of the vehicle system maintenance rules to the plurality of time-stamped precedent vehicle fault data, and
generate a maintenance report corresponding to the imminent occurrence of the subsequent vehicle fault so that proactive maintenance is performed on the vehicle system;
wherein the plurality of time-stamped precedent vehicle fault data corresponds with the precedent historical vehicle fault data, and the subsequent vehicle fault corresponds with the subsequent different historical vehicle fault data.

2. The vehicle health monitoring system of claim 1, wherein the vehicle system maintenance rules generation module is configured to:
receive historical vehicle usage data; and
combine the historical vehicle usage data with the correlation determined for the pairs of the precedent historical vehicle fault data and the subsequent different historical vehicle fault data to generate the vehicle system maintenance rules.

3. The vehicle health monitoring system of claim 2, wherein the historical vehicle usage data includes one or more of an exclusion date, an excursion time, an excursion location, an age of the vehicle, hours of maintenance performed on the vehicle, excursion type, a type of maintenance performed on the vehicle, and an order of precedence of vehicle fault data.

4. The vehicle health monitoring system of claim 1, wherein the vehicle system maintenance rules generation module is configured to:
   determine which pairs of the precedent historical vehicle fault data and the subsequent different historical vehicle fault data exceed a correlation threshold; and
   for at least one pan of the precedent historical vehicle fault data and the subsequent different historical vehicle fault data that exceed the correlation threshold,
      determine a statistically significant number of occurrences of the precedent historical vehicle fault data that occurred prior to an occurrence of the subsequent different historical vehicle fault data, and
      generate a relational matrix including the statistically significant number of occurrences of the precedent historical vehicle fault data that occurred prior to an occurrence of the subsequent different historical vehicle fault data and at least one or more of the precedent historical vehicle fault data, the subsequent different historical vehicle fault data, and historical vehicle usage data.

5. The vehicle health monitoring system of claim 4, wherein the imminent occurrence of the subsequent vehicle fault is based on at least a number of occurrences of the plurality of time-stamped precedent vehicle fault data, where the vehicle system fault detection module is configured to generate the maintenance report when the number of occurrences of the plurality of time-stamped precedent vehicle fault data reaches a first percentage threshold of the statistically significant number of occurrences of the precedent historical vehicle fault data that occurred prior to an occurrence of the subsequent different historical vehicle fault data.

6. The vehicle health monitoring system of claim 4, wherein the vehicle system maintenance rules generation module is configured to, for the at least one pair of the precedent historical vehicle fault data and the subsequent historical different vehicle fault data that exceed the correlation threshold,
   determine a statistically significant duration between occurrences of the precedent historical vehicle fault data that occurred prior to an occurrence of the subsequent different historical vehicle fault data, and
   populate the relational matrix with the statistically significant duration between occurrences of the precedent historical vehicle fault data that occurred prior to an occurrence of the subsequent historical different vehicle fault data.

7. The vehicle health monitoring system of claim 6, wherein the imminent occurrence of the subsequent vehicle fault is based on at least a duration between occurrences of the plurality of time-stamped precedent vehicle fault data, where the vehicle system fault detection module is configured to generate the maintenance report when the duration between occurrences of the plurality of time-stamped precedent vehicle fault data reaches a second percentage threshold of the statistically significant duration between occurrences of the precedent historical vehicle fault data that occurred prior to an occurrence of the subsequent different historical vehicle fault data.

8. A vehicle maintenance scheduling apparatus comprising:
   a records module configured so as to couple with a vehicle to receive historical time-stamped vehicle fault data for a vehicle system;
   a vehicle system fault correlation module configured to
      determine a correlation between pairs of a precedent historical vehicle fault data, of the historical time-stamped vehicle fault data, and a subsequent different historical vehicle fault data, of the historical time-stamped vehicle fault data, and
      generate vehicle system maintenance rules based on the correlation determined for the pairs of the precedent historical vehicle fault data and the subsequent different historical vehicle fault data; and
   a vehicle maintenance scheduling engine configured so as to couple with the vehicle to monitor faults of the vehicle system where the vehicle faults include a plurality of time-stamped precedent vehicle fault data, the vehicle maintenance scheduling engine being further configured to
      apply the vehicle system maintenance rules to the plurality of time-stamped precedent vehicle fault data,
      determine an imminent occurrence of a subsequent vehicle fault, based on the application of the vehicle system maintenance rules to the plurality of time-stamped precedent vehicle fault data, and
      generate a maintenance report corresponding to the imminent occurrence of the subsequent vehicle fault so that proactive maintenance is performed on the vehicle system;
   wherein plurality of time-stamped precedent vehicle fault data corresponds with the precedent historical vehicle fault data, and the subsequent vehicle fault corresponds with the subsequent different historical vehicle fault data.

9. The vehicle maintenance scheduling apparatus of claim 8, wherein one or more of the historical time-stamped vehicle fault data and the plurality of time-stamped precedent vehicle fault data comprises time-stamped fault code messages.

10. The vehicle maintenance scheduling apparatus of claim 8, wherein one or more of the historical time-stamped vehicle fault data and the plurality of time-stamped precedent vehicle fault data comprises time-stamped component failure reports.

11. The vehicle maintenance scheduling apparatus of claim 8, wherein the records module is configured to receive, after one or more of each determination of the imminent occurrence of the subsequent vehicle fault and the occurrence of the subsequent vehicle fault, at least the plurality of time-stamped precedent vehicle fault data for inclusion in the historical time-stamped vehicle fault data.

12. The vehicle maintenance scheduling apparatus of claim 11, wherein the records module is configured to receive, after each determination of the imminent occurrence of the subsequent vehicle fault or after the occurrence of the subsequent vehicle fault, data corresponding to the subsequent vehicle fault for inclusion in the historical time-stamped vehicle fault data.

13. The vehicle maintenance scheduling apparatus of claim 8, further comprising a user interface coupled to the vehicle maintenance scheduling engine, the vehicle maintenance scheduling engine being configured to cause the maintenance report to be presented on the user interface to effect the proactive maintenance.

14. A method for proactive vehicle maintenance, the method comprising:
receiving from a vehicle, with a vehicle system maintenance rules generation module, historical time-stamped vehicle fault data for a vehicle system of the vehicle;
determining, with the vehicle system maintenance rules generation module, a correlation between pairs of a precedent historical vehicle fault data, of the historical time-stamped vehicle fault data, and a subsequent different historical vehicle fault data, of the historical time-stamped vehicle fault data;
generating, with the vehicle system maintenance rules generation module, vehicle system maintenance rules based on the correlation determined for the pairs of the precedent historical vehicle fault data and the subsequent different historical vehicle fault data;
monitoring faults of the vehicle system, with a vehicle system fault detection module, where the vehicle faults include a plurality of time-stamped precedent vehicle fault data;
applying, with the vehicle system fault detection module, the vehicle system maintenance rules to the plurality of time-stamped precedent vehicle fault data;
determining, with the vehicle system fault detection module, an imminent occurrence of a subsequent vehicle fault, based on the application of the vehicle system maintenance rules to the plurality of time-stamped precedent vehicle fault data; and
generating, with the vehicle system fault detection module, a maintenance report corresponding to the imminent occurrence of the subsequent vehicle fault so that proactive maintenance is performed on the vehicle system;
wherein the plurality of time-stamped precedent vehicle fault data corresponds with the precedent historical vehicle fault data, and the subsequent vehicle fault corresponds with the subsequent different historical vehicle fault data.

15. The method of claim 14, further comprising:
with the vehicle system maintenance rules generation module,
receiving historical vehicle usage data; and
combining the historical vehicle usage data with the correlation determined for the pairs of the precedent historical vehicle fault data and the subsequent different historical vehicle fault data to generate the vehicle system maintenance rules.

16. The method of claim 15, wherein the historical vehicle usage data includes one or more of an excursion date, an excursion time, an excursion location, an age of the vehicle, hours of maintenance performed on the vehicle, excursion type, a type of maintenance performed on the vehicle, and an order of precedence of vehicle fault data.

17. The method of claim 14, further comprising:
with the vehicle system maintenance rules generation module,
determining which pairs of the precedent historical vehicle fault data and the subsequent different historical vehicle fault data exceed a correlation threshold; and
for at least one pair of the precedent historical vehicle fault data and the subsequent different historical vehicle fault data that exceed the correlation threshold,
determining a statistically significant number of occurrences of the precedent historical vehicle fault data that occurred prior to an occurrence of the subsequent different historical vehicle fault data, and
generating a relational matrix including the statistically significant number of occurrences of the precedent historical vehicle fault data that occurred prior to an occurrence of the subsequent different historical vehicle fault data and at least one or more of the precedent historical vehicle fault data, the subsequent different historical vehicle fault data, and historical vehicle usage data.

18. The method of claim 17, wherein the imminent occurrence of the subsequent vehicle fault is based on at least a number of occurrences of the plurality of time-stamped precedent vehicle fault data, the method further comprising:
generating, with the vehicle system fault detection module, the maintenance report when the number of occurrences of the plurality of time-stamped precedent vehicle fault data reaches a first percentage threshold of the statistically significant number of occurrences of the precedent historical vehicle fault data that occurred prior to an occurrence of the subsequent different historical vehicle fault data.

19. The method of claim 17, further comprising:
with the vehicle system maintenance rules generation module, for the at least one pair of the precedent historical vehicle fault data and the subsequent different historical vehicle fault data that exceed the correlation threshold,
determining a statistically significant duration between occurrences of the precedent historical vehicle fault data that occurred prior to an occurrence of the subsequent different historical vehicle fault data, and
populating the relational matrix with the statistically significant duration between occurrences of the precedent historical vehicle fault data that occurred prior to an occurrence of the subsequent different historical vehicle fault data.

20. The method of claim 19, wherein the imminent occurrence of the subsequent vehicle fault is based on at least a duration between occurrences of the plurality of time-stamped precedent vehicle fault data, the method further comprising:
generating, with the vehicle system fault detection module, the maintenance report when the duration between occurrences of the plurality of time-stamped precedent vehicle fault data reaches a second percentage threshold of the statistically significant duration between occurrences of the precedent historical vehicle fault data that occurred prior to an occurrence of the subsequent different historical vehicle fault data.

* * * * *